(12) United States Patent  
Han et al.

(10) Patent No.: US 10,999,501 B2  
(45) Date of Patent: May 4, 2021

(54) ELECTRONIC DEVICE AND METHOD FOR CONTROLLING DISPLAY OF PANORAMA IMAGE

(71) Applicant: Samsung Electronics Co., Ltd., Suwon-si (KR)

(72) Inventors: Jonghyun Han, Seoul (KR); Bokeun Kim, Suwon-si (KR); Kyuok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 15/190,847

(22) Filed: Jun. 23, 2016

(65) Prior Publication Data

US 2016/0381291 A1  Dec. 29, 2016

(30) Foreign Application Priority Data

Jun. 24, 2015  (KR) .................. 10-2015-0089768

(51) Int. Cl.
*H04N 5/232* (2006.01)
*G06T 11/60* (2006.01)
(Continued)

(52) U.S. Cl.
CPC ......... *H04N 5/23238* (2013.01); *G06F 16/29* (2019.01); *G06F 16/5866* (2019.01); *G06F 16/739* (2019.01); *G06F 16/9537* (2019.01); *G06T 7/70* (2017.01); *G06T 11/60* (2013.01); *G06T 15/20* (2013.01); *G06T 2200/24* (2013.01); *H04N 5/23293* (2013.01); *H04N 5/772* (2013.01)

(58) Field of Classification Search
CPC ........... H04N 5/23238; H04N 5/23293; H04N 5/772; G06T 7/70; G06T 11/60; G06F 17/30241; G06F 17/30268; G06F 17/3087
See application file for complete search history.

(56) References Cited

U.S. PATENT DOCUMENTS

| 8,508,652 B2 | 8/2013 | Albu et al. |
| 2003/0197785 A1 | 10/2003 | White et al. |

(Continued)

FOREIGN PATENT DOCUMENTS

| CN | 102469259 A | 5/2012 |
| CN | 106791485 A | 5/2017 |

(Continued)

OTHER PUBLICATIONS

Feng Liu et al. "Video retargeting: automating pan and scan", ACM Multimedia 2006 & Co-Located Workshops: Oct. 23-27, 2006, Saanta Barbara, California, USA, MM '06, Proceedings, ACM Press, New York, NY, Oct. 23, 2006, pp. 241-250, XP002605061.

(Continued)

*Primary Examiner* — Michael E Teitelbaum
(74) *Attorney, Agent, or Firm* — Jefferson IP Law, LLP

(57) ABSTRACT

An electronic device includes a display configured to display a panorama image and a processor. The processor controls to extract at least one focus by analyzing at least one object included in the panorama image and to display an area including the extracted at least one focus in the display by determining the area as a play viewpoint of the panorama image.

19 Claims, 19 Drawing Sheets

(51) Int. Cl.
*G06F 17/30* (2006.01)
*G06T 7/70* (2017.01)
*H04N 5/77* (2006.01)
*G06F 16/29* (2019.01)
*G06F 16/58* (2019.01)
*G06F 16/9537* (2019.01)
*G06T 15/20* (2011.01)
*G06F 16/738* (2019.01)

(56) References Cited

U.S. PATENT DOCUMENTS

| | | |
|---|---|---|
| 2009/0262180 A1 | 10/2009 | Kim et al. |
| 2012/0105577 A1 | 5/2012 | Sakata |
| 2012/0194637 A1 | 8/2012 | Han et al. |
| 2012/0200725 A1 | 8/2012 | Albu et al. |
| 2014/0267593 A1 | 9/2014 | Kim et al. |
| 2014/0333718 A1 | 11/2014 | Chang et al. |
| 2014/0351763 A1* | 11/2014 | Lee .................. G03B 37/00 715/838 |

FOREIGN PATENT DOCUMENTS

| | | |
|---|---|---|
| JP | 2010-218107 A | 9/2010 |
| KR | 10-1242550 B1 | 3/2013 |
| KR | 10-2014-0110624 A | 9/2014 |
| KR | 10-2014-0112909 A | 9/2014 |
| KR | 10-1473215 B1 | 12/2014 |
| WO | 2012/105768 A2 | 8/2012 |

OTHER PUBLICATIONS

Chinese Office Action dated Jun. 28, 2020, issued in Chinese Application No. 201680037070.1.

* cited by examiner

ELECTRONIC DEVICE AND METHOD FOR CONTROLLING DISPLAY OF PANORAMA IMAGE

CROSS-REFERENCE TO RELATED APPLICATION(S)

This application claims the benefit under 35 U.S.C. § 119(a) of a Korean patent application filed on Jun. 24, 2015 in the Korean Intellectual Property Office and assigned Serial number 10-2015-0089768, the entire disclosure of which is hereby incorporated by reference.

TECHNICAL FIELD

The present disclosure relates to a technology of controlling a display of a 360° panorama image in an electronic device having a flat display.

BACKGROUND

Portable terminals are continuously evolving according to the development of mobile communication and processor technology and a user's needs for new and various functions. Accordingly, such portable terminals (or electronic devices) have to output multimedia contents in various forms besides general communication functions such as voice communication and message transmission.

Further, multimedia contents are evolving to contain a full actual scene according to the development of photographic equipment and image processing technology, and a panorama image having 360° viewpoints can be provided so that a larger space can be included in an image format according to the related art. Such a panorama image can be produced by a method of moving a photographing viewpoint slowly and synthesizing images at each viewpoint or by using a recently developed virtual reality (VR) equipment that can photograph all the space simultaneously in 360° and generate a panorama image according to the related art. Further, the panorama image can be produced not only in a still image form but also in a moving image form, and the panorama image in a content can be played simultaneously at 360° viewpoints.

The panorama image can have 360° viewpoints as shown by FIGS. 1A and 1B. For convenience in description, the panorama image can be converted to a flat form as shown by FIG. 1C, where the left and right end viewpoints are connected together.

Meanwhile, a portable terminal can play only the partial area of the panorama image because of a limited screen size. Further, even a device having a large screen such as a television (TV) or a monitor cannot output 360° play viewpoints simultaneously. Therefore, in case of playing a panorama image in an electronic device having a flat display that does not support 360° viewpoints, it is important to decide a viewpoint of the panorama image that should be displayed in the flat display.

Some meaningful play viewpoints desired by a user may exist in the panorama image, and they may change according to the play time of the panorama image; however, the method cannot extract a meaningful play viewpoint and provide a corresponding scene for a user according to the related art.

Hereinabove, the background of the present disclosure has been described for easier understanding; however, it will be understood by those skilled in the art that the present disclosure is not limited to the well-known technology according to the related art.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for controlling a display of a panorama image in the electronic device that can provide a meaningful play viewpoint of an image when playing a 360° panorama image.

In accordance with an aspect of the present disclosure, an electronic device is provided. The electronic device includes a display configured to display a panorama image and a processor. The processor controls to extract at least one focus by analyzing at least one object included in the panorama image and to display an area including the extracted at least one focus in the display by determining the area as a play viewpoint of the panorama image.

In accordance with another aspect of the present disclosure, a method for controlling a display of a panorama image in an electronic device is provided. The method includes extracting at least one focus by analyzing at least one object included in the panorama image and displaying an area including the extracted at least one focus in the display by determining the area as a play viewpoint of the panorama image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
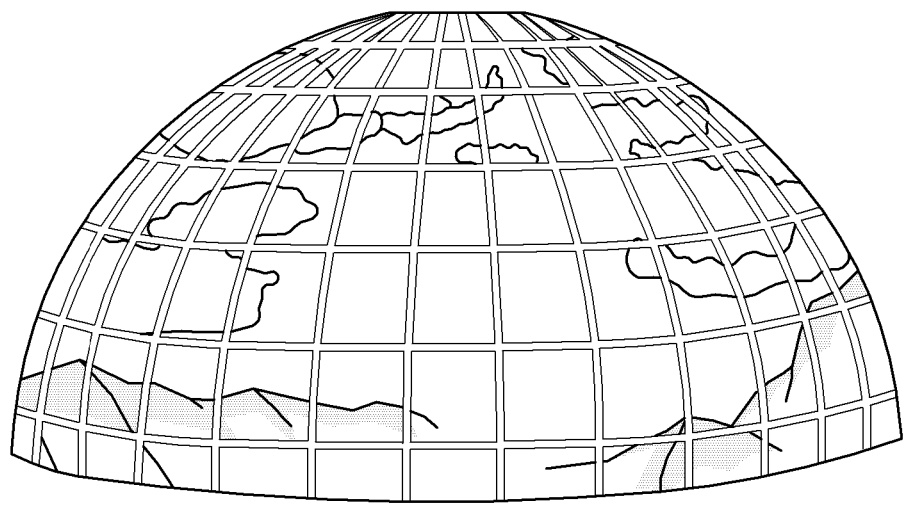
FIGS. 1A, 1B, and 1C are schematic drawings illustrating examples of panorama images according to various embodiments of the present disclosure.
Figure 1B:
Figure 1C:
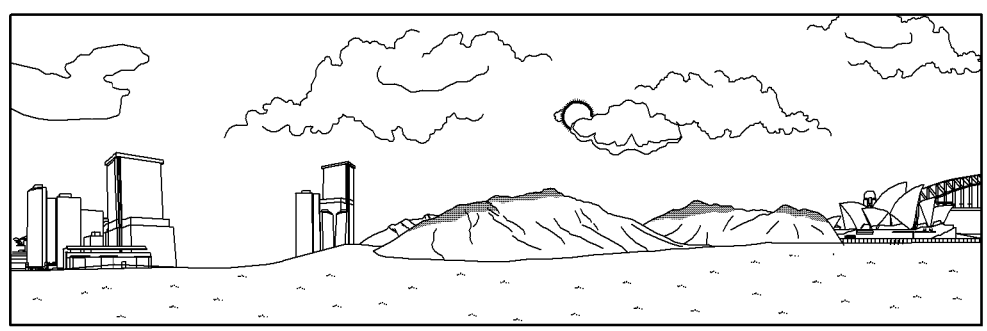

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, operation, element, component, or combination thereof described in a specification and does not exclude presence or addition of at least one other characteristic, numeral, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate various embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), an Moving Picture Experts Group phase 1 or phase 2 (MPEG-1 or MPEG-2) audio layer 3 (MP3) player, a portable medical device, a digital camera, or a wearable device (e.g., an head mounted device (HMD) such as electronic glasses, electronic clothes, an electronic bracelet, an electronic necklace, an electronic accessory, or a smart watch).

According to some embodiments, an electronic device may be a smart home appliance that involves a communication function. For example, an electronic device may be a television (TV), a digital versatile disc (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., magnetic resonance angiography (MRA), magnetic resonance imaging (MRI), computed tomography (CT), ultrasonography, etc.), a navigation device, a global positioning system (GPS) receiver, an event data recorder (EDR), an flight data recorder (FDR), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of this disclosure.

Figure 2:
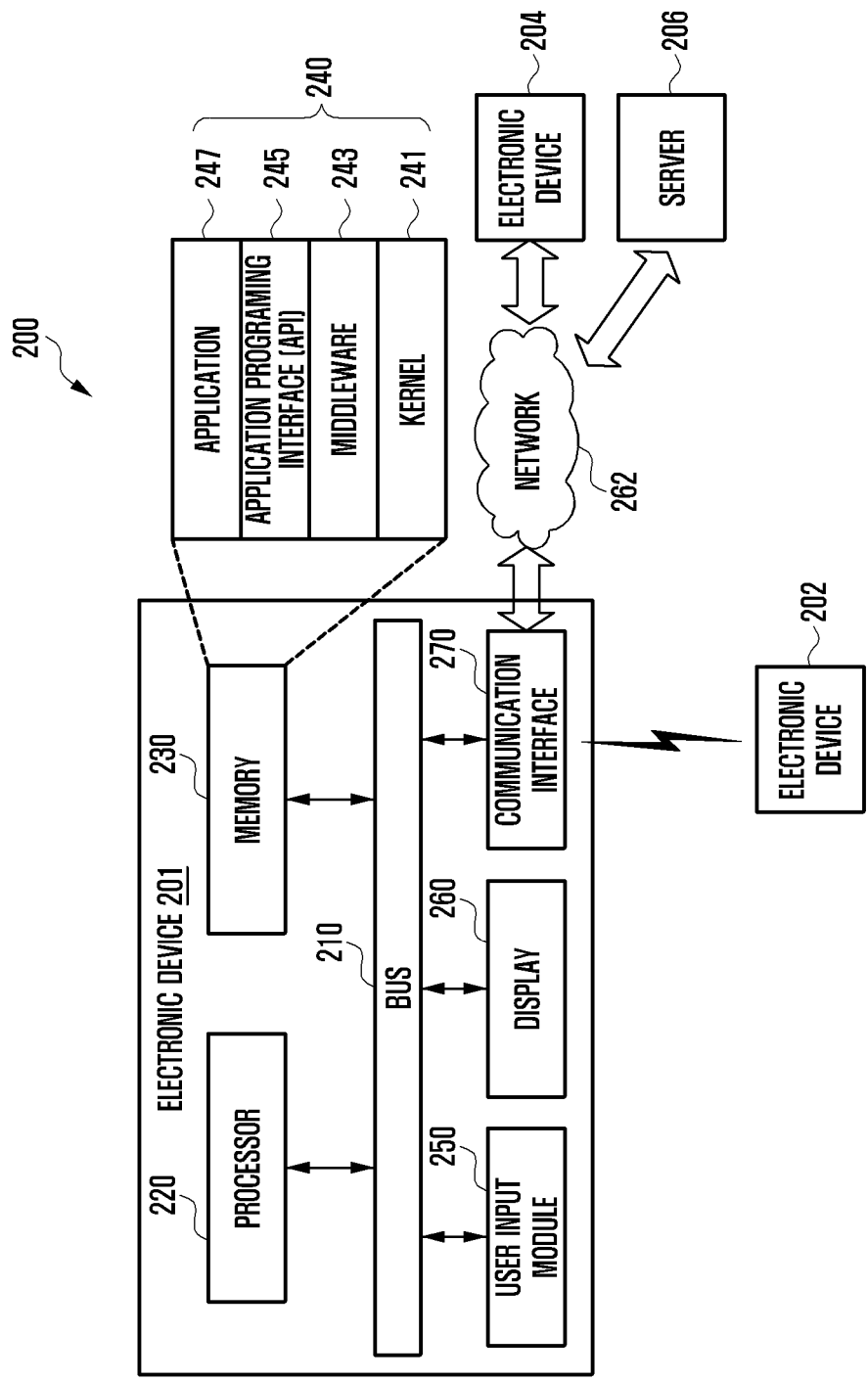
FIG. 2 is a block diagram illustrating electronic devices in a network environment according to an embodiment of the present disclosure.

FIG. 2 is a block diagram 200 illustrating an electronic apparatus according to an embodiment of the present disclosure.

Referring to FIG. 2, the electronic apparatus 201 may include a bus 210, a processor 220, a memory 230, a user input module 250, a display 260, and a communication interface 270.

The bus 210 may be a circuit for interconnecting elements described above and for allowing a communication, e.g. by transferring a control message, between the elements described above.

The processor 220 can receive commands from the above-mentioned other elements, e.g. the memory 230, the user input module 250, the display 260, and the communication interface 270, though, for example, the bus 210, can decipher the received commands, and perform operations and/or data processing according to the deciphered commands.

The memory 230 can store commands received from the processor 220 and/or other elements, e.g. the user input module 250, the display 260, and the communication interface 270, and/or commands and/or data generated by the processor 220 and/or other elements. The memory 230 may include software and/or programs 240, such as a kernel 241, middleware 243, an application programming interface (API) 245, and an application 247. Each of the programming modules described above may be configured by software, firmware, hardware, and/or combinations of two or more thereof.

The kernel 241 can control and/or manage system resources, e.g. the bus 210, the processor 220 or the memory 230, used for execution of operations and/or functions implemented in other programming modules, such as the middleware 243, the API 245, and/or the application 247. Further, the kernel 241 can provide an interface through which the middleware 243, the API 245, and/or the application 247 can access and then control and/or manage an individual element of the electronic apparatus 201.

The middleware 243 can perform a relay function which allows the API 245 and/or the application 247 to communicate with and exchange data with the kernel 241. Further, in relation to operation requests received from at least one of an application 247, the middleware 243 can perform load balancing in relation to the operation requests by, for example, giving a priority in using a system resource, e.g. the bus 210, the processor 220, and/or the memory 230, of the electronic apparatus 201 to at least one application from among the at least one of the application 247.

The API 245 is an interface through which the application 247 can control a function provided by the kernel 241 and/or the middleware 243, and may include, for example, at least one interface or function for file control, window control, image processing, and/or character control.

The user input module 250 can receive, for example, a command and/or data from a user, and transfer the received command and/or data to the processor 220 and/or the memory 230 through the bus 210. The display 260 can display an image, a video, and/or data to a user.

The communication interface 270 can establish a communication between the electronic apparatus 201 and other electronic devices 202 and 204 and/or a server 206. The communication interface 270 can support short range communication protocols, e.g. a Wi-Fi protocol, a BlueTooth (BT) protocol, and a near field communication (NFC) protocol, communication networks, e.g. Internet, local area network (LAN), wireless area network (WAN), a telecommunication network, a cellular network, and a satellite network, or a plain old telephone service (POTS), or any other similar and/or suitable communication networks, such as network 262, or the like. Each of the electronic devices 202 and 204 may be a same type and/or different types of electronic apparatus.

Figure 3:
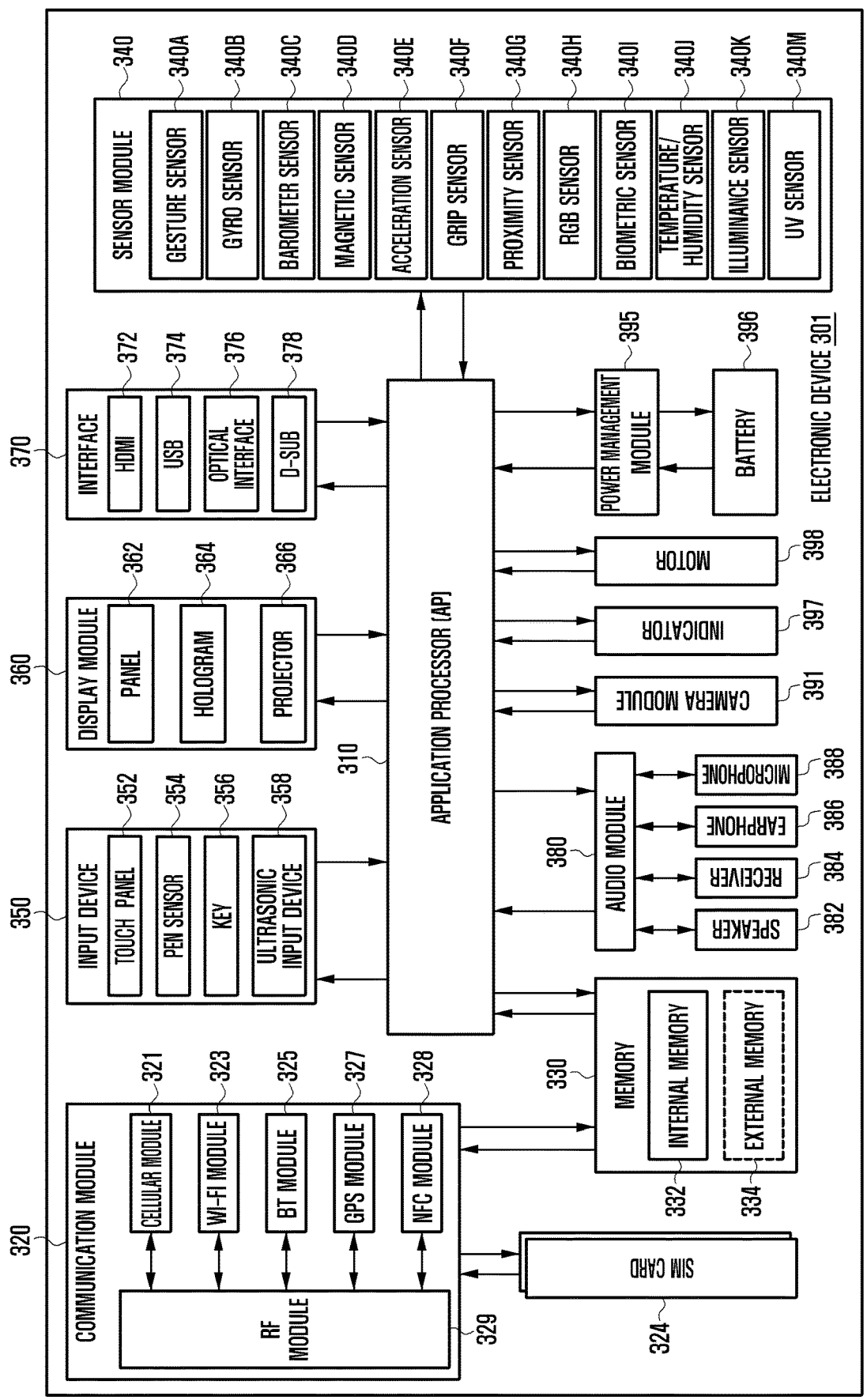
FIG. 3 is a block diagram illustrating a configuration of an electronic device according to an embodiment of the present disclosure

FIG. 3 is a block diagram illustrating an electronic device 301 in accordance with an embodiment of the present disclosure. The electronic device 301 may form, for example, the whole or part of the electronic device 201 shown in FIG. 2. Referring to FIG. 3, the electronic device 301 may include at least one application processor (AP) 310, a communication module 320, a subscriber identification module (SIM) card 324, a memory 330, a sensor module 340, an input device 350, a display 360, an interface 370, an audio module 380, a camera module 391, a power management module 395, a battery 396, an indicator 397, and a motor 398.

The AP 310 may drive an operating system or applications, control a plurality of hardware or software components connected thereto, and also perform processing and operation for various data including multimedia data. The AP 310 may be formed of system-on-chip (SoC), for example. According to an embodiment, the AP 310 may further include a graphic processing unit (GPU) (not shown).

The communication module 320 (e.g., the communication interface 270, FIG. 2) may perform a data communication with any other electronic device (e.g., the electronic device 204 or the server 206) connected to the electronic device 301 (e.g., the electronic device 201) through the network. According to an embodiment, the communication module 320 may include therein a cellular module 321, a Wi-Fi module 323, a BT module 325, a GPS module 327, an NFC module 328, and an RF (Radio Frequency) module 329.

The cellular module 321 may offer a voice call, a video call, a message service, an internet service, or the like through a communication network (e.g., long term evolution (LTE), LTE advanced (LTE-A), code division multiple access (CDMA), wideband CDMA (WCDMA), universal mobile telecommunications system (UMTS), wireless broadband (WiBro), or Global System for Mobile Communications (GSM), etc.). Additionally, the cellular module 321 may perform identification and authentication of the electronic device in the communication network, using the SIM card 324. According to an embodiment, the cellular module 321 may perform at least part of functions the AP 310 can provide. For example, the cellular module 321 may perform at least part of a multimedia control function.

According to an embodiment, the cellular module 321 may include a communication processor (CP). Additionally, the cellular module 321 may be formed of SoC, for example. Although some elements such as the cellular module 321 (e.g., the CP), the memory 330, or the power management module 395 are shown as separate elements being different from the AP 310 in FIG. 3, the AP 310 may be formed to have at least part (e.g., the cellular module 321) of the above elements in an embodiment.

According to an embodiment, the AP 310 or the cellular module 321 (e.g., the CP) may load commands or data, received from a nonvolatile memory connected thereto or from at least one of the other elements, into a volatile memory to process them. Additionally, the AP 310 or the cellular module 321 may store data, received from or created at one or more of the other elements, in the nonvolatile memory.

Each of the Wi-Fi module 323, the BT module 325, the GPS module 327 and the NFC module 328 may include a processor for processing data transmitted or received therethrough. Although FIG. 3 shows the cellular module 321, the Wi-Fi module 323, the BT module 325, the GPS module 327 and the NFC module 328 as different blocks, at least part of them may be contained in a single integrated circuit (IC) chip or a single IC package in an embodiment. For example, at least part (e.g., the CP corresponding to the cellular module 321 and a Wi-Fi processor corresponding to the Wi-Fi module 323) of respective processors corresponding to the cellular module 321, the Wi-Fi module 323, the BT module 325, the GPS module 327 and the NFC module 328 may be formed as a single SoC.

The RF module 329 may transmit and receive data, e.g., RF signals or any other electric signals. Although not shown, the radio frequency (RF) module 329 may include a transceiver, a power amp module (PAM), a frequency filter, a low noise amplifier (LNA), or the like. Also, the RF module 329 may include any component, e.g., a wire or a conductor, for transmission of electromagnetic waves in a free air space. Although FIG. 3 shows that the cellular module 321, the Wi-Fi module 323, the BT module 325, the GPS module 327 and the NFC module 328 share the RF module 329, at least one of them may perform transmission and reception of RF signals through a separate RF module in an embodiment.

The SIM card 324 may be a specific card formed of SIM and may be inserted into a slot formed at a certain place of the electronic device 301. The SIM card 324 may contain therein an integrated circuit card Identifier (ICCID) or an international mobile subscriber identity (IMSI).

The memory 330 (e.g., the memory 230 in FIG. 2) may include an internal memory 332 and an external memory 334. The internal memory 332 may include, for example, at least one of a volatile memory (e.g., dynamic RAM (DRAM), Static RAM (SRAM), Synchronous DRAM (SDRAM), etc.) or a nonvolatile memory (e.g., One Time Programmable ROM (OTPROM), Programmable ROM (PROM), erasable and programmable ROM (EPROM ( ), Electrically Erasable and Programmable ROM (EEPROM), mask ROM, flash ROM, NAND flash memory, NOR flash memory, etc.).

According to an embodiment, the internal memory 332 may have the form of a solid state drive (SSD). The external memory 334 may include a flash drive, e.g., compact flash (CF), secure digital (SD), Micro Secure Digital (Micro-SD), mini secure digital (Mini-SD), eXtreme digital (D), memory stick, or the like. The external memory 334 may be functionally connected to the electronic device 301 through various interfaces. According to an embodiment, the electronic device 301 may further include a storage device or medium such as a hard drive.

The sensor module 340 may measure physical quantity or sense an operating status of the electronic device 301, and then convert measured or sensed information into electric signals. The sensor module 340 may include, for example, at least one of a gesture sensor 340A, a gyro sensor 340B, an atmospheric sensor 340C, a magnetic sensor 340D, an acceleration sensor 340E, a grip sensor 340F, a proximity sensor 340G, a color sensor 340H (e.g., red, blue, green (RGB) sensor), a biometric sensor 340I, a temperature-humidity sensor 340J, an illumination sensor 340K, and a ultraviolet (UV) sensor 340M. Additionally or alternatively, the sensor module 340 may include, e.g., an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scan sensor (not shown), or a finger scan sensor (not shown). Also, the sensor module 340 may include a control circuit for controlling one or more sensors equipped therein.

The input device 350 may include a touch panel 352, a digital pen sensor 354, a key 356, or an ultrasonic input unit 358. The touch panel 352 may recognize a touch input in a manner of capacitive type, resistive type, infrared type, or ultrasonic type. Also, the touch panel 352 may further include a control circuit. In case of a capacitive type, a physical contact or proximity may be recognized. The touch panel 352 may further include a tactile layer. In this case, the touch panel 352 may offer a tactile feedback to a user.

The digital pen sensor 354 may be formed in the same or similar manner as receiving a touch input or by using a separate recognition sheet. The key 356 may include, for example, a physical button, an optical key, or a keypad. The ultrasonic input unit 358 is a specific device capable of identifying data by sensing sound waves with a microphone 388 in the electronic device 301 through an input tool that generates ultrasonic signals, thus allowing wireless recognition. According to an embodiment, the electronic device 301 may receive a user input from any external device (e.g., a computer or a server) connected thereto through the communication module 320.

The display 360 (e.g., the display 350) may include a panel 362, a hologram 364, or a projector 366. The panel 362 may be, for example, liquid crystal display (LCD), active matrix organic light emitting diode (AM-OLED), or the like. The panel 362 may have a flexible, transparent or wearable form. The panel 362 may be formed of a single module with the touch panel 352. The hologram 364 may show a stereoscopic image in the air using interference of light. The projector 366 may project an image onto a screen, which may be located at the inside or outside of the electronic device 301. According to an embodiment, the display 360 may further include a control circuit for controlling the panel 362, the hologram 364, and the projector 366.

The interface 370 may include, for example, a high-definition multimedia interface (HDMI) 372, a Universal Serial Bus (USB) 374, an optical interface 376, or a D-sub-miniature (D-sub) 378. The interface 370 may be contained, for example, in the communication interface 270 shown in FIG. 2. Additionally or alternatively, the interface 370 may include, for example, a Mobile High-definition Link (MHL) interface, a secure digital (SD) card/multi-media card (MMC) interface, or an Infrared Data Association (IrDA) interface.

The audio module 380 may perform a conversion between sounds and electric signals. The audio module 380 may process sound information inputted or outputted through a speaker 382, a receiver 384, an earphone 386, or a microphone 388.

The camera module 391 is a device capable of obtaining still images and moving images. According to an embodiment, the camera module 391 may include at least one image sensor (e.g., a front sensor or a rear sensor), a lens (not shown), an image signal processor (ISP) (not shown), or a flash (e.g., LED or xenon lamp, not shown).

The power management module 395 may manage electric power of the electronic device 301. Although not shown, the power management module 395 may include, for example, a power management integrated circuit (PMIC), a charger IC, or a battery or fuel gauge.

The PMIC may be formed, for example, of an IC chip or SoC. Charging may be performed in a wired or wireless manner. The charger IC may charge a battery 396 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 396 and a voltage, current or temperature in a charging process. The battery 396 may store or create electric power therein and supply electric power to the electronic device 301. The battery 396 may be, for example, a rechargeable battery or a solar battery.

The indicator 397 may show thereon a current status (e.g., a booting status, a message status, or a recharging status) of the electronic device 301 or of its part (e.g., the AP 310). The motor 398 may convert an electric signal into a mechanical vibration. Although not shown, the electronic device 301 may include a specific processor (e.g., GPU) for supporting a mobile TV. This processor may process media data that comply with standards of digital multimedia broadcasting (DMB), digital video broadcasting (DVB), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of application-specific integrated circuit (ASIC) chip, field-programmable gate arrays (FPGAs), and programmable-logic device, which have been known or are to be developed.

Figure 4:
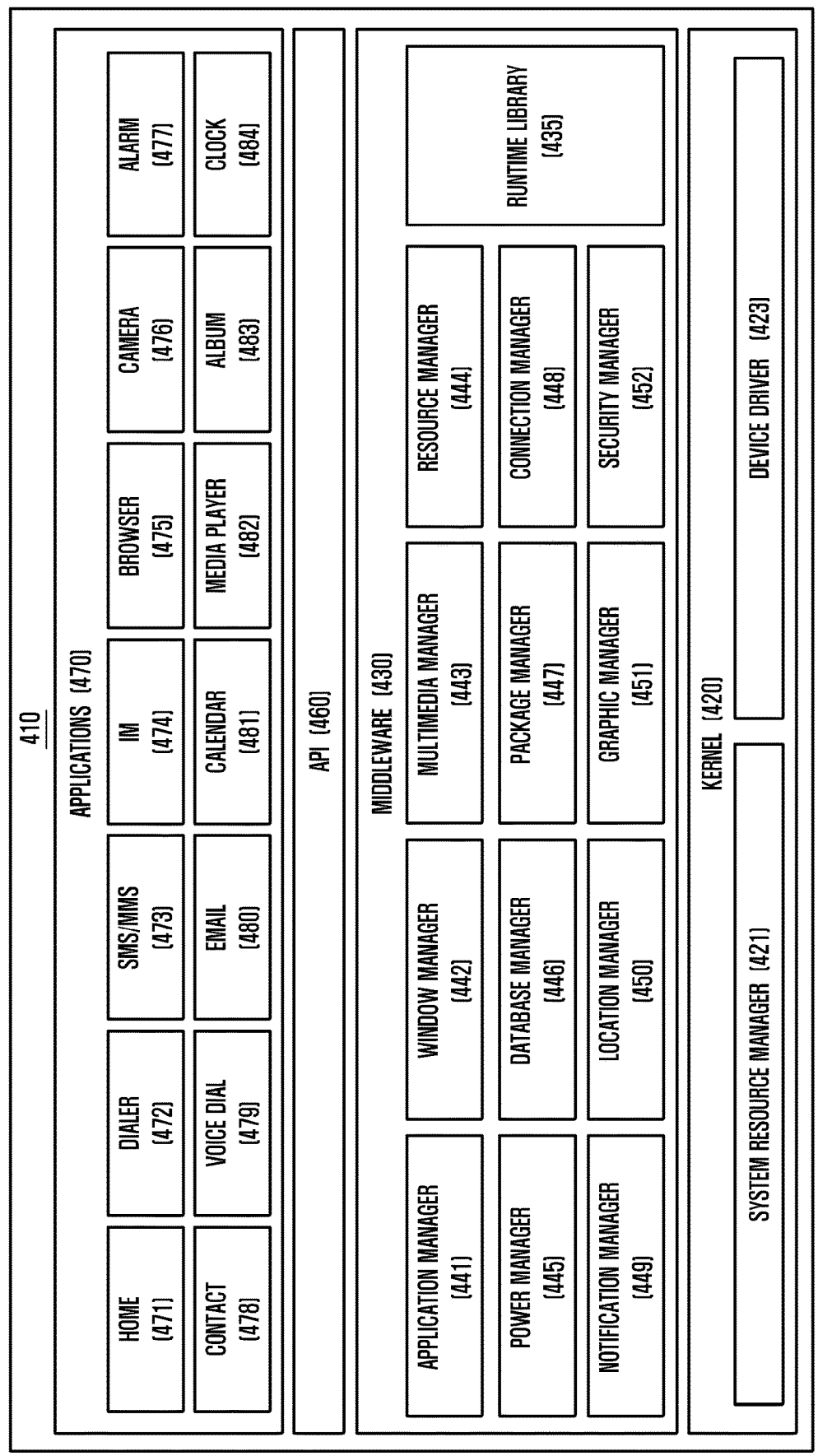
FIG. 4 is a block diagram illustrating a configuration of a program module according to an embodiment of the present disclosure.

FIG. 4 is a block diagram illustrating a configuration of a programming module 410 according to an embodiment of the present disclosure.

Referring to FIG. 4, the programming module 410 may be included (or stored) in the electronic device 201 (e.g., the memory 230) illustrated in FIG. 2 or may be included (or stored) in the electronic device 301 (e.g., the memory 330) illustrated in FIG. 3. At least a part of the programming module 410 may be implemented in software, firmware, hardware, or a combination of two or more thereof. The programming module 410 may be implemented in hardware, and may include an OS controlling resources related to an electronic device (e.g., the electronic device 201 or 301) and/or various applications (e.g., applications 470) executed in the OS. For example, the OS may be Android, iOS, Windows, Symbian, Tizen, Bada, and the like.

Referring to FIG. 4, the programming module 410 may include a kernel 420, a middleware 430, an API 460, and/or the applications 470.

The kernel 420 (e.g., the kernel 241) may include a system resource manager 421 and/or a device driver 423. The system resource manager 421 may include, for example, a process manager (not illustrated), a memory manager (not illustrated), and a file system manager (not illustrated). The system resource manager 421 may perform the control, allocation, recovery, and/or the like of system resources. The device driver 423 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 423 may include an inter-process communication (IPC) driver (not illustrated).

The middleware 430 may include multiple modules previously implemented so as to provide a function used in common by the applications 470. Also, the middleware 430 may provide a function to the applications 470 through the API 460 in order to enable the applications 470 to efficiently use limited system resources within the electronic device. For example, as illustrated in FIG. 4, the middleware 430 (e.g., the middleware 243) may include at least one of a runtime library 435, an application manager 441, a window manager 442, a multimedia manager 443, a resource manager 444, a power manager 445, a database manager 446, a package manager 447, a connection manager 448, a notification manager 449, a location manager 450, a graphic manager 451, a security manager 452, and any other suitable and/or similar manager.

The runtime library 435 may include, for example, a library module used by a complier, in order to add a new function by using a programming language during the execution of the application 470. According to an embodiment of the present disclosure, the runtime library 435 may perform functions which are related to input and output, the management of a memory, an arithmetic function, and/or the like.

The application manager 441 may manage, for example, a life cycle of at least one of the applications 470. The window manager 442 may manage GUI resources used on the screen. The multimedia manager 443 may detect a format used to reproduce various media files and may encode or decode a media file through a codec appropriate for the relevant format. The resource manager 444 may manage resources, such as a source code, a memory, a storage space, and/or the like of at least one of the applications 470.

The power manager 445 may operate together with a basic input/output system (BIOS), may manage a battery or power, and may provide power information and the like used for an operation. The database manager 446 may manage a database in such a manner as to enable the generation, search and/or change of the database to be used by at least one of the applications 470. The package manager 447 may manage the installation and/or update of an application distributed in the form of a package file.

The connection manager 448 may manage a wireless connectivity such as, for example, Wi-Fi and Bluetooth. The notification manager 449 may display or report, to the user, an event such as an arrival message, an appointment, a proximity alarm, and the like in such a manner as not to disturb the user. The location manager 450 may manage location information of the electronic device. The graphic manager 451 may manage a graphic effect, which is to be provided to the user, and/or a user interface related to the graphic effect. The security manager 452 may provide various security functions used for system security, user authentication, and the like. According to an embodiment of the present disclosure, when the electronic device (e.g., the electronic device 201) has a telephone function, the middleware 430 may further include a telephony manager (not illustrated) for managing a voice telephony call function and/or a video telephony call function of the electronic device.

The middleware 430 may generate and use a new middleware module through various functional combinations of the above-described internal element modules. The middleware 430 may provide modules specialized according to types of OSs in order to provide differentiated functions. Also, the middleware 430 may dynamically delete some of the existing elements, or may add new elements. Accordingly, the middleware 430 may omit some of the elements described in the various embodiments of the present disclosure, may further include other elements, or may replace the some of the elements with elements, each of which performs a similar function and has a different name.

The API 460 (e.g., the API 245) is a set of API programming functions, and may be provided with a different configuration according to an OS. In the case of Android or iOS, for example, one API set may be provided to each platform. In the case of Tizen, for example, two or more API sets may be provided to each platform.

The applications 470 (e.g., the application 247) may include, for example, a preloaded application and/or a third party application. The applications 470 (e.g., the application 247) may include, for example, a home application 471, a dialer application 472, a short message service (SMS)/multimedia message service (MMS) application 473, an instant message (IM) application 474, a browser application 475, a camera application 476, an alarm application 477, a contact application 478, a voice dial application 479, an electronic mail (e-mail) application 480, a calendar application 481, a media player application 482, an album application 483, a clock application 484, and any other suitable and/or similar application.

At least a part of the programming module 410 may be implemented by instructions stored in a non-transitory computer-readable storage medium. When the instructions are executed by one or more processors (e.g., the application processor 310), the one or more processors may perform functions corresponding to the instructions. The non-transitory computer-readable storage medium may be, for example, the memory 330. At least a part of the programming module 410 may be implemented (e.g., executed) by, for example, the one or more processors. At least a part of the programming module 410 may include, for example, a module, a program, a routine, a set of instructions, and/or a process for performing one or more functions.

Figure 5:
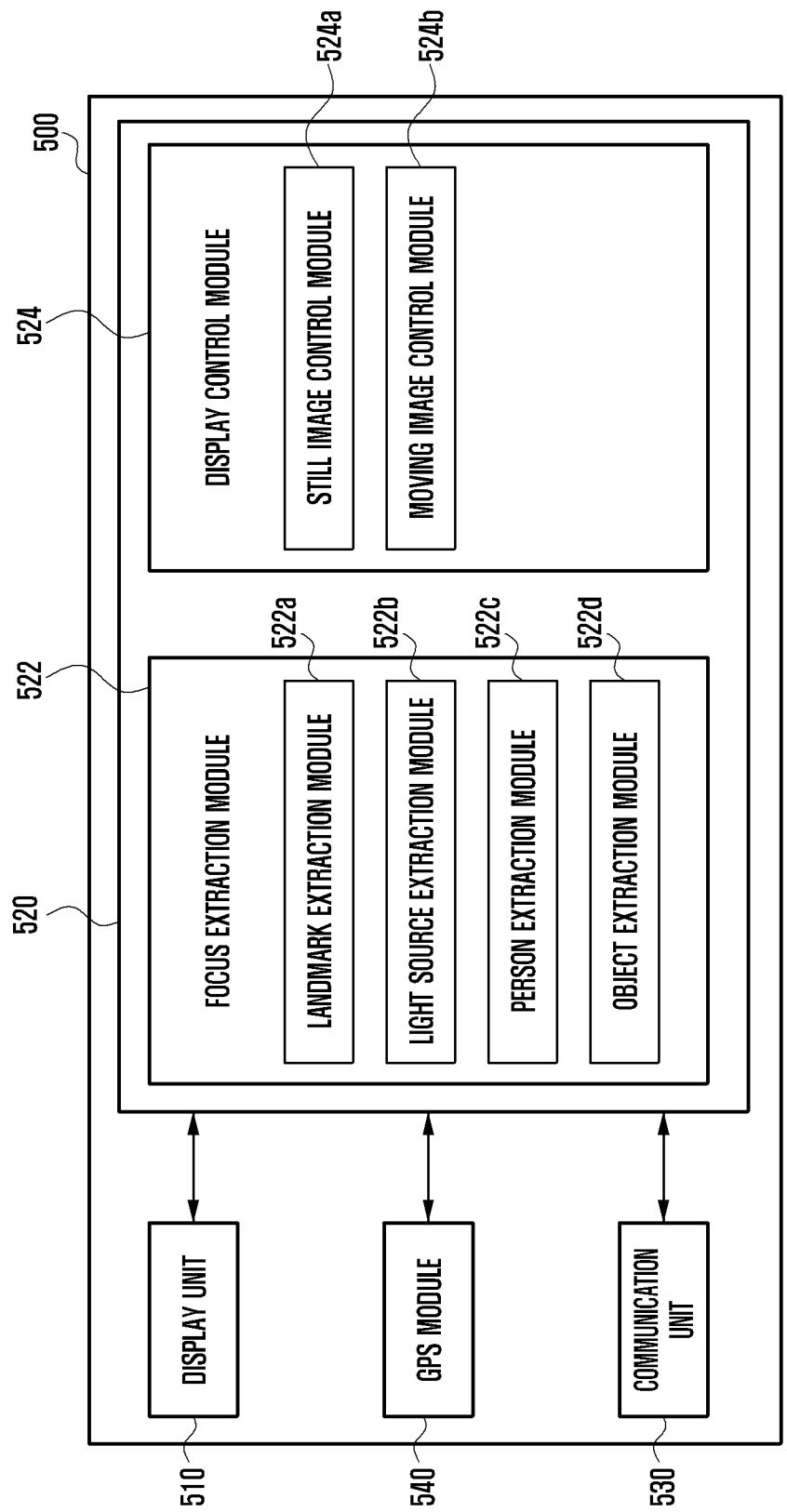
FIG. 5 is a block diagram illustrating a configuration of an electronic device according to an embodiment of the present disclosure.

FIG. 5 is a block diagram illustrating a configuration of an electronic device according to an embodiment of the present invention.

Referring to FIG. 5, the electronic device 500 according to an embodiment of the present disclosure may include a display unit 510, control unit 520, GPS module 540, and communication unit 530. In more detail, the control unit 520 may include a focus extraction module 522 and a display control module 524. The focus extraction module 522 may include a landmark extraction module 522a, light source extraction module 522b, person extraction module 522c, and object extraction module 522d; and the display control module 524 may include a still image control module 524a and a moving image control module 524b. The electronic device 500 may further include at least one of the technical configurations of the electronic device 201 shown in FIG. 2 and the electronic device 301 shown in FIG. 3. However, there will be no problem in implementing the present disclosure even though some components shown in FIG. 5 are omitted or replaced with other components.

The electronic device 500 according to various embodiments of the present disclosure may be a smartphone, tablet PC, laptop PC, or digital television (DTV); however, any device that can output an image content to a display having a limited size can be used as an electronic device for implementing the present disclosure without being limited to the above examples.

The display unit 510 displays an image. The display unit 510 may be configured with a well-known display panel and a panel driving device, such as an OLED and LCD, and practical implementation is not limited to the above example. The display unit 510 may include at least one of the components of the display 360 shown in FIG. 3

Meanwhile, an image displayed in the display unit 510 may be a still image or a moving image, which is stored in a storage (not shown) of the electronic device 500 or received from an external device in a streaming method. Further, the electronic device 500 according to various embodiments of the present disclosure can process a panorama image having 360° viewpoints. When displaying a panorama image in the electronic device 500, there is a restriction that only the partial viewpoints of the panorama image can be displayed because the display unit 510 has a limited size.

Further, the display unit 510 may include a touch panel which can detect a touch input generated by a user's finger or a stylus. The touch panel may include at least one of the components of the touch panel 352 shown in FIG. 3

The control unit is a computing device which controls general operations of the electronic device 500 according to various embodiments of the present disclosure, and it may be configured with a computing device such as a central processing unit (CPU) and an application processor (AP); however, the present disclosure is not limited to the above examples according to the related art. The control unit 520 may include at least one of the technical configurations of the processor 220 shown in FIG. 2 and the application processor 310 shown in FIG. 3

The control unit 520 can perform various control functions for the electronic device 500; however, characteristics related to focus extraction and image display control of a panorama image will be described hereafter according to the technical spirit of the present disclosure. Although not described in detail hereafter, well-known operations performed by a control unit or a processor of an electronic device can be also performed by the control unit 520 according to the related art.

The control unit 520 can extract at least one focus by analyzing at least one object included in a panorama image and can control to display an area including the extracted at least one focus in the display unit 510 by determining the area as a play viewpoint of the panorama image. In more detail, the control unit 520 may include a focus extraction module 522 for extracting at least one focus by analyzing at least one object included in a panorama image and a display control module 524 for controlling to display an area including the extracted at least one focus in the display unit 510 by determining the area as a play viewpoint of the panorama image.

Here, the focus extraction module 522 and the display control module 524 may not be configured in separate hardware and they can be divided into a processing, threading, instruction, application, or data units performed by the control unit 520 or stored in a memory. Alternatively, the focus extraction module 522 and the display control module 524 can operate as a hardware or software module.

The focus extraction module 522 extracts at least one focus by analyzing at least one object included in a panorama image. Here, the object may include various objects included in the panorama image such as a building, signboard, person, and light; and the focus extraction module 522 can extract an object through a process of line approximation, contour information obtainment, and shape analysis by using at least one of well-known various image processing methods and object extracting methods. Further, the focus extraction module 522 extracts a corresponding object as a focus by identifying a meaningful object from the objects extracted from the panorama image. Namely, in the present disclosure, the focus can be interpreted as a meaningful object included in a panorama image.

The focus extraction module 522 may include a landmark extraction module 522a for extracting a landmark such as a building, geographical feature, and sculpture from the panorama image, light source extraction module 522b for extracting a light source corresponding to the brightness of illumination, person extraction module 522c for extracting a person from an image, and object extraction module 522d for extracting specific objects such as a window and a door. A method of extracting a focus by using each extraction module will be described in more detail referring to FIGS. 6A-6B-6B, 8A-8B and 9-11.

Meanwhile, the landmark extraction module 522a, light source extraction module 522b, person extraction module 522c, and object extraction module 522d may not have to perform an object analysis and focus extraction for all the panorama image contents and may perform the object analysis and focus extraction partially according to a user selection or a type of panorama image.

One or more focuses can be extracted by each module, or no focuses can exist. Further, in case that the panorama image is a moving image, the modules can extract a focus at each frame or in a play time unit.

If playing a panorama image is requested by a user of the electronic device 500, the focus extraction module 522 controls to display an area including at least one extracted focus in the display unit 510 by determining the area as a play viewpoint of the panorama image. As described above, the electronic device 500 has a display unit 510 physically limited in size, and it cannot display all the viewpoints simultaneously in 360°. Accordingly, in order to display the panorama image in the display unit 510, the display control module 524 can perform a function of determining the order or type of displaying play viewpoints according to the extracted focuses.

In case that the panorama image is a still image, the display control module 524 (or still image control module 524a) displays an image of the determined play viewpoint in the display unit 510. Namely, if a focus is extracted from the panorama image, the display control module 524 controls to display partial play viewpoints of the panorama image in the display unit 510 with the corresponding focus as the center. If a plurality of focuses is extracted from the panorama image, the display control module 524 controls to play viewpoints of areas including each focus sequentially according to the priority of each focus.

In case that the panorama image is a moving image and thumbnails of the panorama image are to be displayed in a contents list screen, the display control module 524 (or still image control module 524a) can convert partial play viewpoints into thumbnails and display them in the display unit 510 with an extracted focus as the center. For example, when the electronic device 500 displays a list of a plurality of panorama images stored in a storage or received from a streaming server, thumbnails of a moving panorama image can be displayed in the list. Here, the thumbnails can be displayed in the list by extracting from the partial play viewpoints of the panorama image with the focus extracted by the display control module 524 as the center. If the panorama image includes a plurality of focuses, thumbnails can be generated from areas including each focus and displayed sequentially in the order of play times.

If the panorama image is a moving image and playing a panorama image is requested, the display control module 524 (or moving image control module 524b) can determine an area including a focus having the highest priority as an initial play viewpoint from the extracted at least one focus. Further, while playing the panorama image, the display control module 524 can change play viewpoints of the panorama image sequentially according to the priority of the extracted focuses.

Here, the priority of focuses can be determined by each module 522a to 522d included in the focus extraction module 522. For example, a focus extracted by the landmark extraction module 522a may be determined as a first priority, a focus extracted by the light source extraction module 522b may be determined as a second priority, a focus extracted by the person extraction module 522c may be determined as a third priority, and a focus extracted by the object extraction module 522d may be determined as a fourth priority. The display control module 524 can display a landmark having the first priority initially and focuses having second to fourth priorities in sequence.

Further, the electronic device 500 can support a user so that the user can directly determine the priority of focuses. For this, the control unit 520 can generate a GUI including a setting menu for inputting the priority of at least one extracted focus, display the GUI in the display unit 510, and determine the priority of focuses according to a user input. An example of the GUI for inputting the priority of focuses will be described in more detail referring to FIG. 12.

If the focus stops for more than a predetermined time while playing an area including at least one focus, the display control module 524 can change the play viewpoint to an area including a focus having a lower priority. Namely, if there is no change in the play view point while displaying a specific play viewpoint, the play viewpoint can be changed to an area including a focus having a lower priority. For example, if a person stops for a predetermined time while being displayed in an area including the corresponding person object extracted as a focus, or if there is no change in the play viewpoint for a predetermined time while displaying an area including a building object by extracting as a focus, the play viewpoint can be changed to an area including a focus having the next priority.

Further, the display control module 524 can change the play viewpoint to an area including a focus having a lower priority if a predetermined time elapses in a state that one of the play viewpoints is displayed. Here, a base time for changing a focus can be set as a default (for example, 3 or 5 seconds), or a menu for inputting a time for changing the focus can be provided in the aforementioned setting menu in which the priority of focuses can be input, and the base time for changing a focus can be adjusted according to a user input.

Further if a user input for changing the play viewpoint is detected in a state that one of the play viewpoints is displayed, the display control module 524 can change the play viewpoint to a focus having a lower priority. Here, the user input for changing the play viewpoint can be performed by the user input with a finger or a stylus touching a specific area of a touch panel (for example, right or left side) or a displayed icon or moving in a specific direction (for example, right or left direction) in a state of touching a partial area of the touch panel.

When playing a panorama image in an electronic device, only the portion of various play viewpoints of the panorama image is displayed randomly, an area set as default is displayed initially by determining the area as a play viewpoint, and the play viewpoint is displayed by moving (or rotating) according to a user input according to the related art. However, various embodiments of the present disclosure enable a user to watch a panorama image without a loss of a highlighted part by extracting a focus corresponding to a meaningful viewpoint from the panorama image and playing the corresponding focus sequentially and automatically.

The GPS module 540 can identify location information of the electronic device by receiving a GPS signal. The GPS module 540 may include a technical configuration of the GPS module 327 shown in FIG. 3. A procedure of identifying a location of an electronic device by receiving a GPS signal through the GPS module 540 is a well-known technology; therefore, a detailed description of the procedure is omitted here.

The communication unit 530 performs a function of connecting to a network through wired or wireless communication and exchanging data with an external server through the network. According to various embodiments of the present disclosure, the communication unit 530 can transmit the location information of the electronic device identified by the GPS module 540 to an external server (not shown) and receive landmark information corresponding to the location information from the external server.

The external server can store information such as coordinates of each location, building, geographical feature, and sculpture as landmark information, and the landmark information may be an image of a corresponding landmark or a text indicating a landmark.

According to various embodiments of the present disclosure, operations of the control unit 520 can be performed by an application (or program) installed in the electronic device 500. Namely, an operation of extracting a focus by the focus extraction module 522, operation of controlling a play viewpoint of a panorama image by the display control module 524, operation of transmitting location information to an external server and receiving landmark information, and operation of displaying a GUI including a setting menu and receiving a user input can be performed by the corresponding application.

For example, if an application installed in the electronic device 500 is executed according to a user input, image files stored in the electronic device 500 or received from an external server in a streaming method can be provided in a 360° panorama image list, and the application can play a panorama image selected by a user. Further, the application can display a setting menu related to playing a panorama image by providing a setting menu icon, determining the priority of focuses, and determining time for moving to a focus having a lower priority, and changing settings of the application according to a user input.

Various embodiments for extracting a focus from a panorama image and various embodiments for determining a play viewpoint and displaying them in the electronic device 500 will be described in detail referring to FIGS. 6A-6B, 7, 8A-8B, and 9-11.

FIGS. 6A-6B, 7, 8A-8B, and 9-11 illustrate spread panorama images for convenience in description.

Figure 6A:
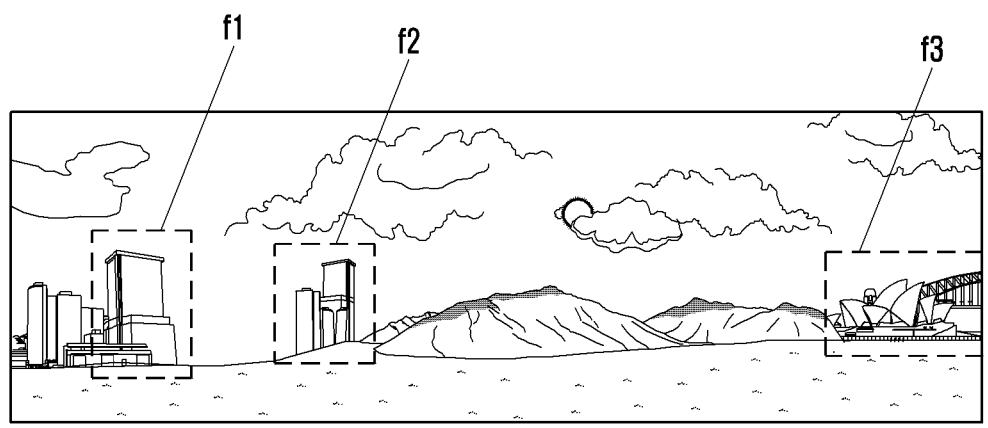
FIGS. 6A, 6B, 7, 8A, 8B, 9, 10 and 11 are schematic drawings illustrating examples of extracting a focus according to various embodiments of the present disclosure.
Figure 6B:
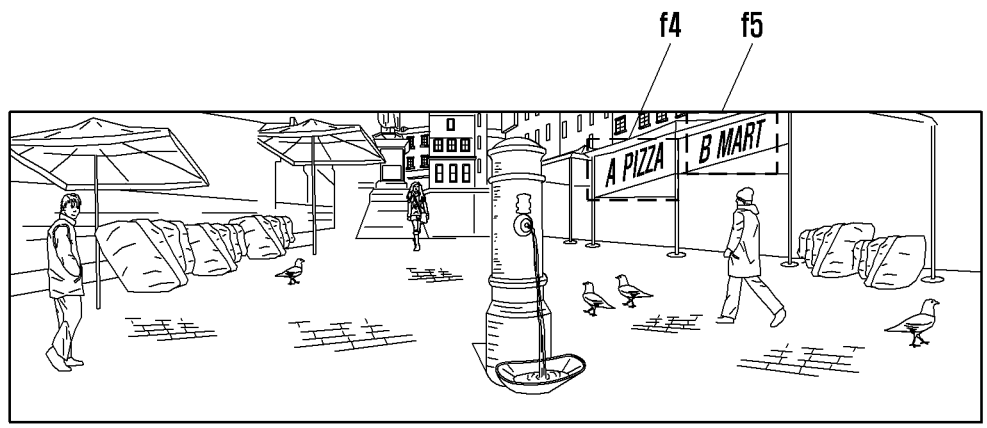

FIGS. 6A and 6B are schematic drawings illustrating a method of extracting a focus in a landmark extraction module 522a.

The panorama image of FIG. 6A includes various objects such as a building, mountain, and cloud. The landmark extraction module 522a can extract building objects f1, f2, and f3 corresponding to meaningful viewpoints from the panorama image.

Here, the communication unit 530 can transmit location information of the electronic device 500 identified by the GPS module 540 to an external server and receive landmark information corresponding to the current location from the external server. Here, the landmark information may be an image corresponding to a landmark, and the landmark extraction module 522a can extract objects f1, f2, and f3 as focuses from a plurality of objects (for example, buildings, mountain, and cloud) by using landmark information received from the external server.

Meanwhile, the landmark information received from the external server may include a text. Namely, the landmark information may include a text indicating a name of a landmark and an address located near by the current location of the electronic device 500.

Referring to FIG. 6B, the landmark extraction module 522a can extract objects such as a signboard including a text from the panorama image and extract objects f4 and f5 as focuses which are matched with text information of landmarks corresponding to the current location.

Figure 7:
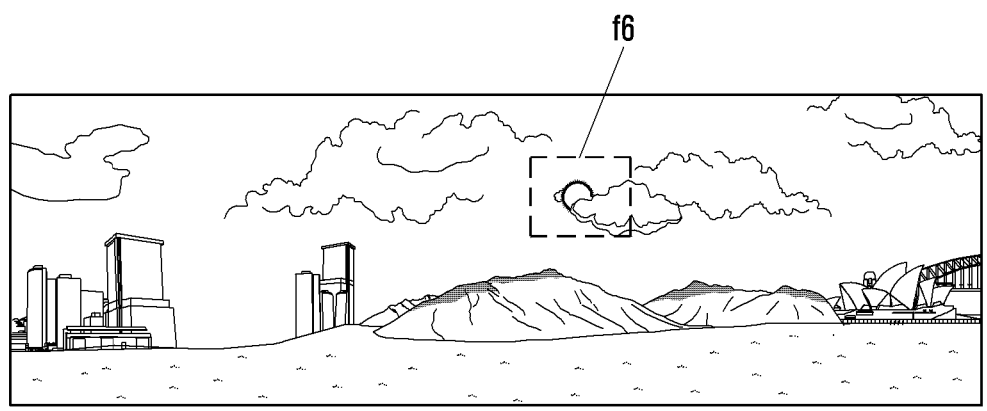

FIG. 7 illustrates a method for extracting a focus by using a light source extraction module 522b.

The light source extraction module 522b can extract an area having a brightness greater than a predetermined value from the panorama image.

Referring to FIG. 7, an area f6 is identified as having a brightness greater than the predetermined value and can be extracted as a focus.

Because the panorama image includes 360° viewpoints, there is a possibility that an object cannot be clearly identified because of backlight. For this, the light source extraction module 522b can extract an area where a user can easily identify a focus.

Figure 8A:
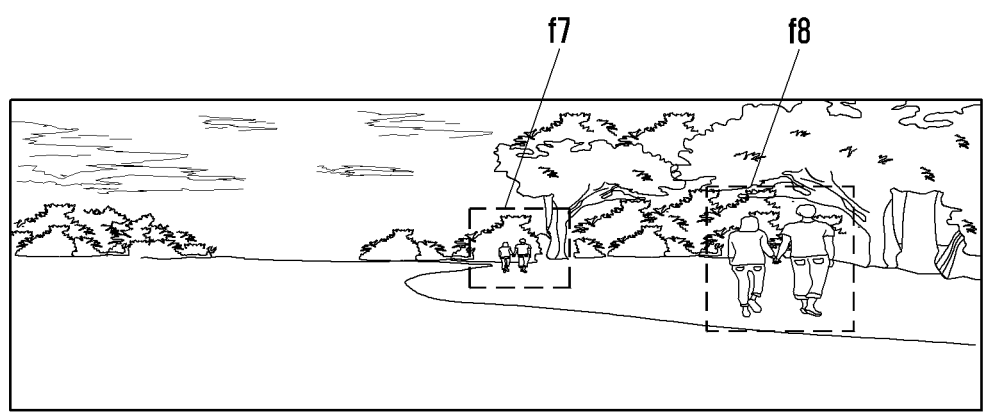
Figure 8B:
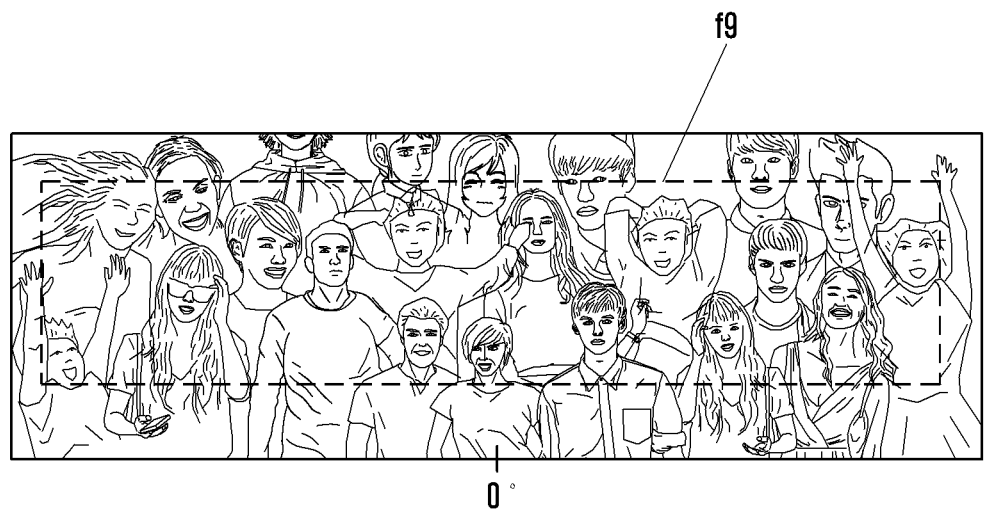
Figure 8B:
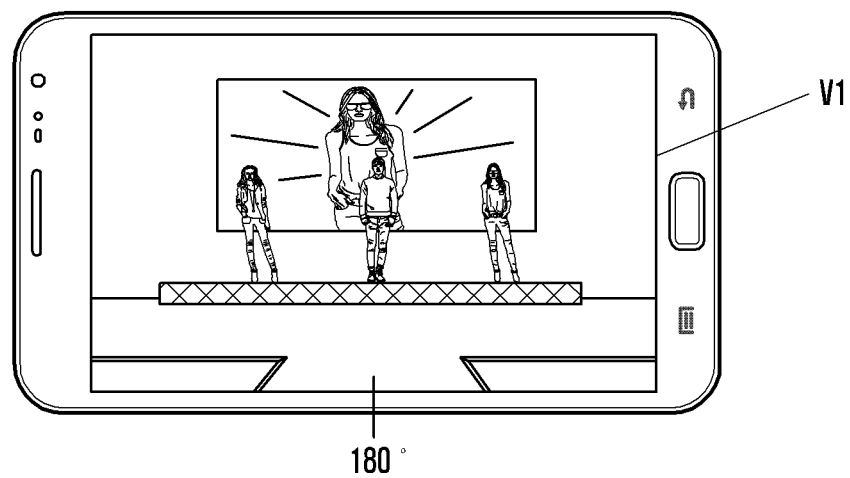

FIGS. 8A and 8B illustrate a method for extracting a focus by using a person extraction module 522c.

Referring to FIGS. 8A and 8B, the person extraction module 522c can extract person objects included in a panorama image and can extract a meaningful object as a focus from the person objects. If a small number of persons are in the panorama image as shown in FIG. 8A, an object f8 located closest (or having the biggest size) can be extracted as a focus, or a speaking or moving person object f7 can be extracted as a focus.

If a large number of persons are in a panorama image as shown in FIG. 8B, a play viewpoint V1 can be determined as a focus by extracting an object f9 at which the large number of persons are looking. This follows the assumption that a meaningful object exists in the direction in which a plurality of persons is looking.

Figure 9:
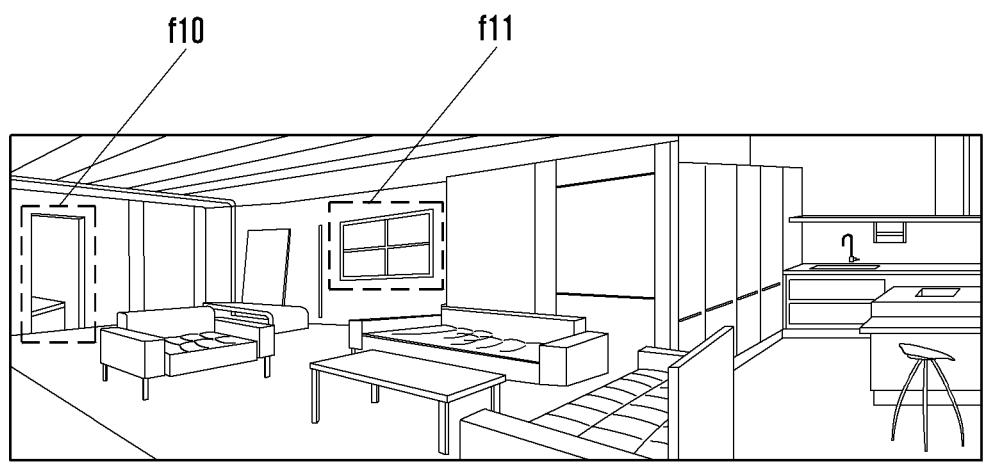

FIG. 9 illustrates a method for extracting a focus by using an object extraction module 522d.

Referring to FIG. 9, the object extraction module 522d can extract specific objects f10 and f11 (for example, a door and a window) as a focus from a photographic space of a panorama image.

Meanwhile, the display control module 524 can determine the priority of focuses according to the module that extracted each focus. For example, if focuses corresponding to a landmark, person, and light source are extracted respectively by the landmark extraction module 522a, person extraction module 522c, and light source extraction module 522b, play viewpoints can be determined by determining the landmark as a first priority, person as a second priority, and light source as a third priority. Further, if a plurality of focuses is extracted by each module, areas including a landmark are played sequentially, and areas including a person or a light source are played sequentially. The above embodiment is merely an example of implementing the present disclosure, which can be variously determined according to a user input through a setting menu or a practical implementation form.

Figure 10:
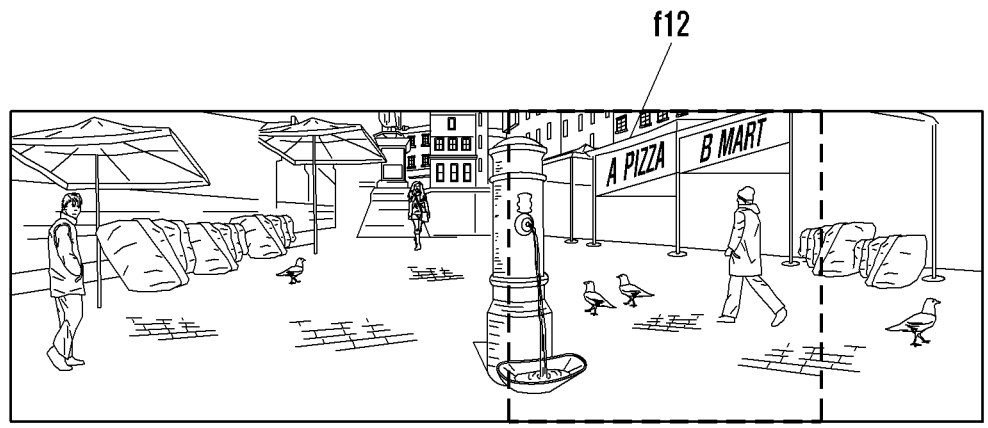
Figure 10:
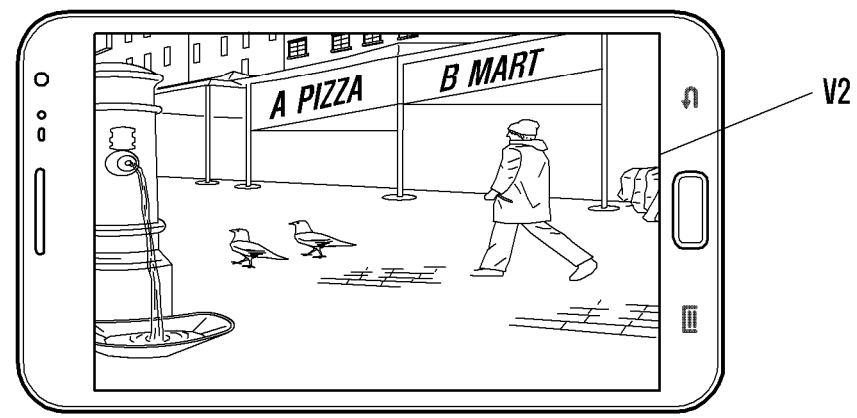

FIG. 10 illustrates a method for determining a play viewpoint in case that the panorama image is a still image or a thumbnail is extracted.

Referring to FIG. 10, the panorama image, the landmark extraction module 522a can extract an object f12 as a focus, which is matched with a name text of a landmark located near by the current location of the electronic device 500.

If the panorama image is a still image, an area V2 including a focus according to a user input of the electronic device 500 can be determined as a play viewpoint. Further, in case that the panorama image is a moving image and a thumbnail of a corresponding panorama image is displayed, an area V2 including a focus f12 can be determined as a play viewpoint.

Although a specific area having a focus f12 in the center is determined as a play viewpoint in FIG. 10, the present disclosure is not limited to this example. The play viewpoint may be determined according to a specific structure change such as moving the focus from the center to 70% right side. Further, if a plurality of focuses is located adjacent to each other in a panorama still image, the adjacent focuses can be combined into a group and an area including the group can be determined as a play viewpoint.

Figure 11:
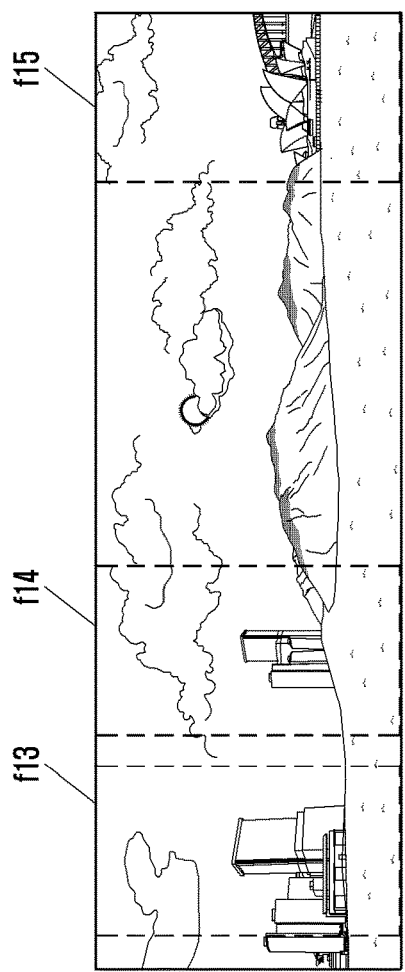
Figure 11:
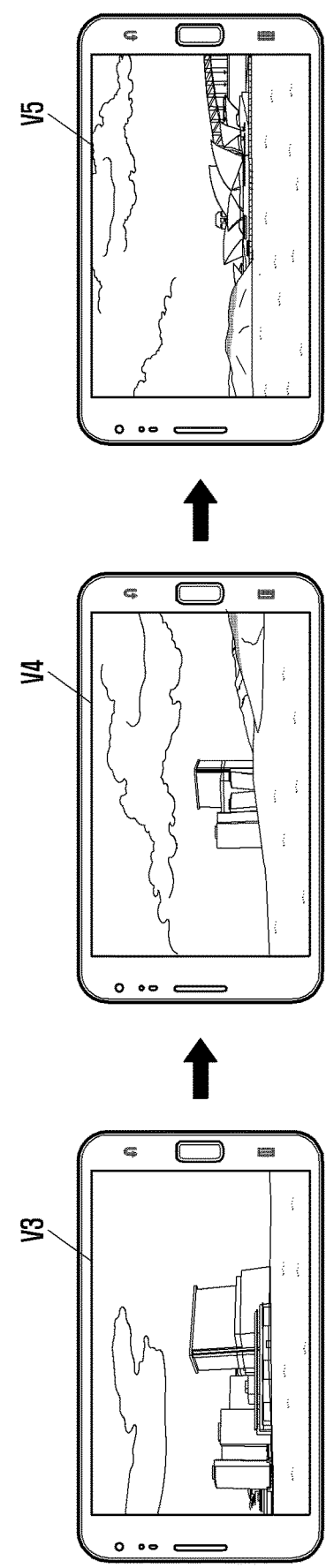

FIG. 11 illustrates a method for determining a play viewpoint in case that the panorama image is a moving image.

Referring to FIG. 11, the focus extraction module 522 can extract f13, f14, and f15 as focuses and the priority of focuses can be determined in the order of f13, f14, and f15.

If playing a panorama image is requested, the display control module 524 displays f13 having the highest priority in screen V3, and if a predetermined time elapses or the focus f13 does not change for a predetermined time, an area V4 including a focus f14 with a lower priority can be determined as the play viewpoint. Further, if a predetermined time elapses or the focus f14 does not change for a predetermined time in a state of displaying screen V4, an area V5 including a focus f15 with a further lower priority can be determined as the play viewpoint.

Figure 12:
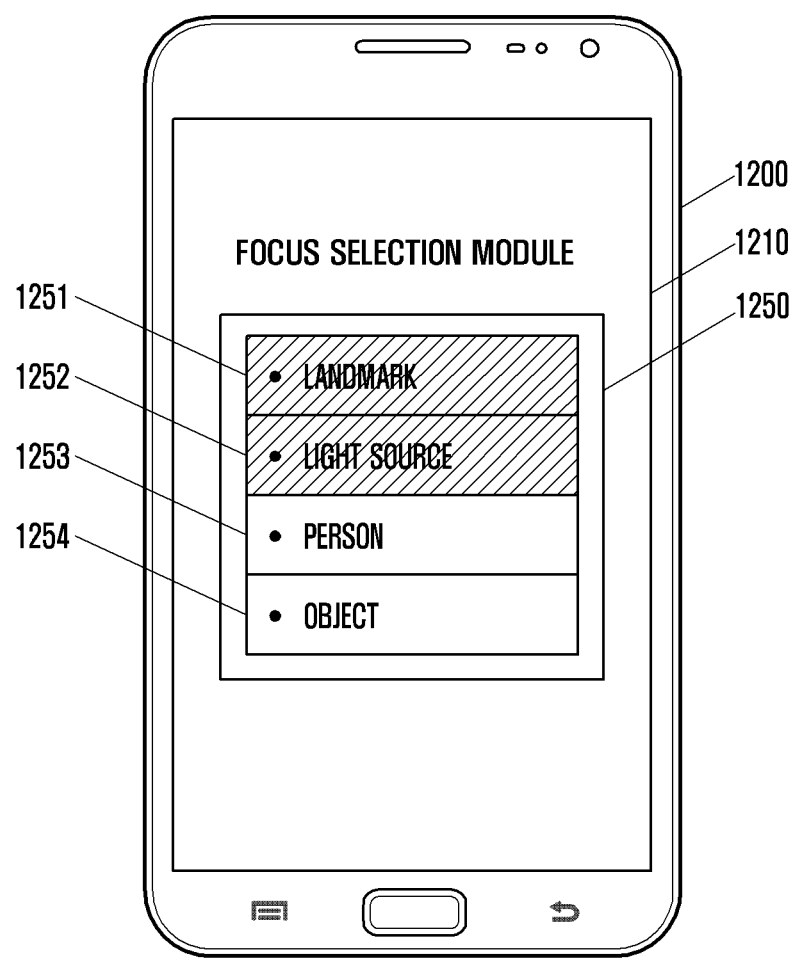
FIG. 12 is a schematic drawing illustrating an example of a graphical user interface (GUI) screen according to an embodiment of the present disclosure.

FIG. 12 illustrates a setting menu GUI with which a user can input the priority of focuses according to an embodiment of the present disclosure.

Referring to FIG. 12, the control unit 520 generates a GUI 1250 for inputting the priority of a focus extracted by the focus extraction module 522 and displays the GUI 1250 in the display 1210 of the mobile device 1200.

Referring to FIG. 12, types of each focus can be displayed in a text form (1251 to 1254). As another embodiment, the control unit 520 can generate a thumbnail from an area including at least one extracted focus and display the thumbnail in the GUI 1250.

A user can select at least one focus from the GUI 1250, and the control unit 520 can determine the priority of focuses according to a user input through the GUI 1250. For example, if the user selects a landmark 1251 and a light source 1252 from the extracted focuses, an area including the landmark 1251 and light source 1252 can be determined as a play viewpoint and can be displayed sequentially in the display unit 510 when playing a panorama image. Further, the user can adjust the priority of each focus (1251 to 1252) through the GUI 1250.

Although FIG. 12 shows only the GUI 1250 for inputting the priority of focuses, various setting menus can be provided to set time for changing to a focus having a lower priority, image size, location of focus, or structure through the displayed the GUI for receiving a user input.

The electronic device 500 according to various embodiments of the present disclosure may include a display unit 510 for displaying a panorama image and a control unit 520. The control unit 520 can extract at least one focus by analyzing at least one object included in the panorama image and can control to display an area including the extracted at least one focus in the display unit 510 by determining the area as a play viewpoint of the panorama image.

Here, the control unit 520 may include a focus extraction module 522 for extracting at least one focus and a display control module 524 for determining a play viewpoint of the panorama image.

If the panorama image is a still image, the control unit 520 can control to display an image of the determined play viewpoint in the display unit 510.

If the panorama image is a moving image and displaying a thumbnail of the panorama image is requested, the control unit 520 can extract a thumbnail from the image of the determined play viewpoint and display the thumbnail in the display unit 510.

If the panorama image is a moving image and playing a panorama image is requested, the control unit 520 can determine from the extracted focuses an area including a focus having the highest priority as an initial play viewpoint.

The control unit 520 can change the play viewpoint of the panorama image sequentially according to the priority of the extracted focuses.

If the focus stops for more than a predetermined time in a state of playing an area including the focus, the control unit 520 can change the play viewpoint to an area including a focus having a lower priority.

The electronic device 500 further includes a GPS module 540 for identifying location information of the electronic device 500 by receiving a GPS signal, and the control unit 520 can identify landmark information corresponding to location information of the electronic device 500 identified by the GPS module 540 and extract at least one object matched with the landmark information from at least one focus included in the panorama image.

Here, the landmark information may include a text of a landmark corresponding to the location information of the electronic device 500, and the control unit 520 can extract as a focus at least one object matched with the text of the landmark from the at least one object included in the panorama image.

The electronic device 500 may further include a communication unit 530 for communicating with an external server, and the communication unit 530 can transmit location information of the electronic device 500 identified by the GPS module 540 to the external server and receive the landmark information corresponding to the location information from the external server.

The control unit 520 can extract an area having a brightness higher than a predetermined value from a panorama image as a focus.

As the focus, the control unit 520 can extract at least one person object from the objects included in the panorama image, a moving person object from the person objects, or an object located at the location at which the person objects are looking.

The control unit 520 can generate and display a GUI for inputting the priority of the extracted at least one focus in the display unit 510 and determine the priority of the focus through the GUI according to a user input.

Figure 13:
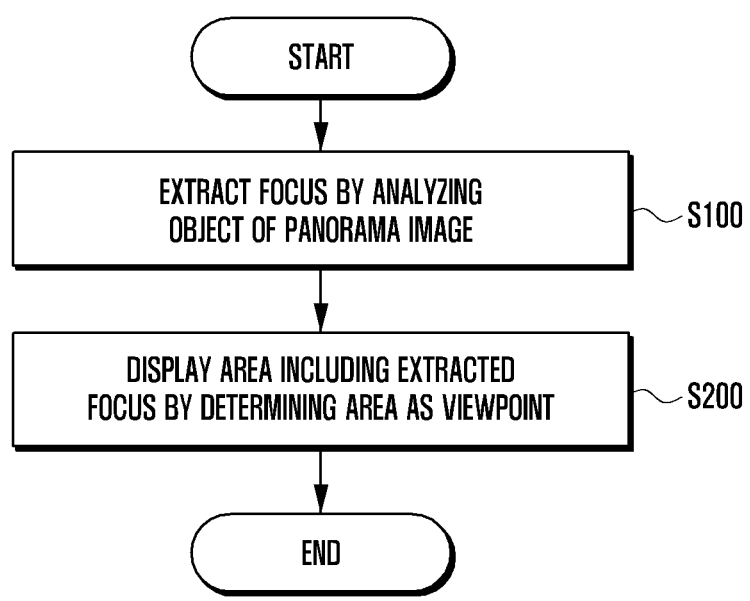
FIGS. 13, 14, and 15 are flowcharts illustrating a method for controlling a display of a panorama image in an electronic device according to various embodiments of the present disclosure.
Figure 14:
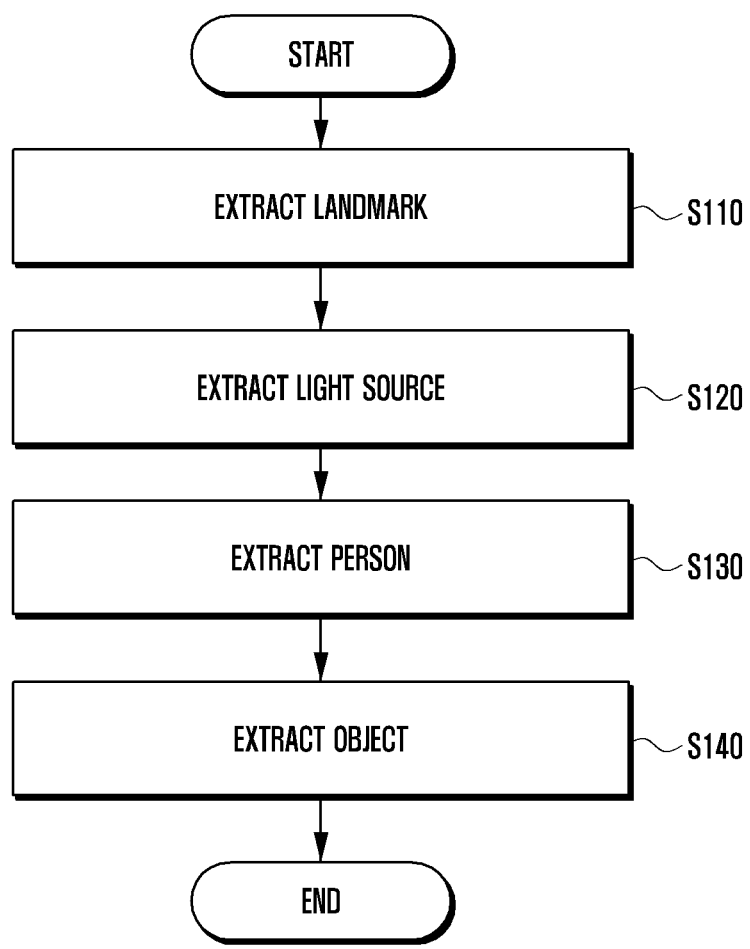
Figure 15:
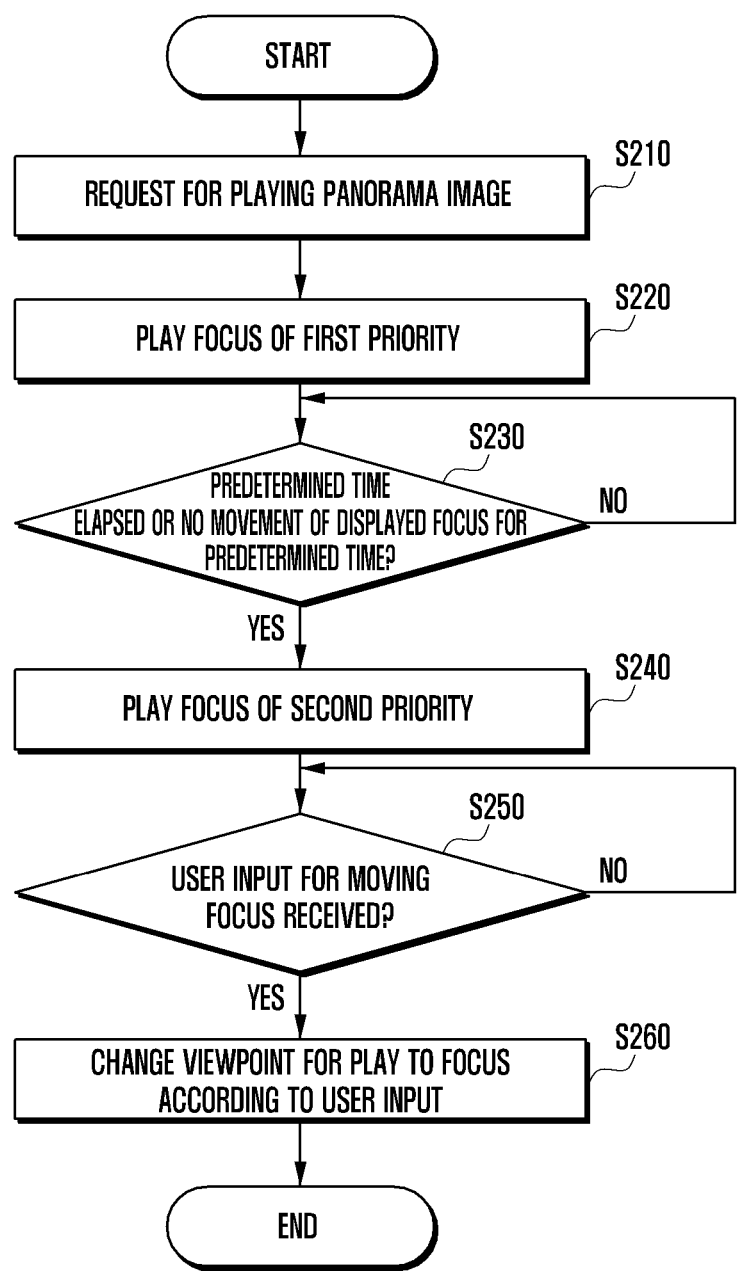

FIGS. 13, 14 and 15 are flowcharts illustrating a method for controlling a panorama image in an electronic device according to various embodiments of the present disclosure. Hereafter, technical characteristics that can be derived from the descriptions of FIGS. 2-5, 6A-6B, 7, 8A-8B and 9-12 will be omitted.

Referring to FIG. 13, a method for controlling a display of a panorama image in an electronic device according to an embodiment of the present disclosure may include an operation S100 for extracting at least one focus by analyzing at least one object included in a panorama image and an operation S200 for displaying an area including the extracted at least one object in a display unit by determining the area as a play viewpoint of the panorama image.

Referring to FIG. 14, FIG. 14 illustrates a more detailed procedure of operation S100 of FIG. 13 which extracts at least one focus by analyzing at least one object included in a panorama image.

As shown in the drawing, the electronic device extracts an object corresponding to a landmark as a focus from objects included in the panorama image at operation S110. Here, the electronic device can transmit location information of the electronic device to an external server connected through a network, and it can receive landmark information corresponding to the location information from the external server. The landmark information may be an image of a corresponding landmark or a text indicating the landmark.

From the objects included in the panorama image, the electronic device can extract an object matched with an image of a landmark or a text indicating the landmark as a focus. Meanwhile, the operation of extracting a landmark as a focus can be performed by the landmark extraction module 522*a* of the electronic device as already described in FIGS. 6A and 6B.

The electronic device extracts an object corresponding to a light source as a focus from the objects included in the panorama image at operation S120. In more detail, the electronic device can extract an area having a brightness greater than a predetermined value as a focus. The operation of extracting a light source as a focus can be performed by the light source extraction module 522*b* of the electronic device as already described in FIG. 7.

The electronic device extracts an object corresponding to a person as a focus from the objects included in the panorama image at operation S130. In more detail, if a small number of persons are in the panorama image, a person object located at the closest distance (or the greatest person object) can be extracted as a focus or a speaking or moving person object can be extracted as a focus. Further, if a large number of persons are in the panorama image, an object at which the large number of persons are looking can be extracted as a focus and determined as a play viewpoint. The operation of extracting a person object as a focus can be performed by the person extraction module 522*c* of the electronic device as already described in FIGS. 8A and 8B.

The electronic device extracts specific objects such as a window or a door as a focus from the panorama image at operation S140. The operation of extracting an object as a focus can be performed by the object extraction module 522*d* of the electronic device as already described in FIG. 9.

Meanwhile, FIG. 14 illustrates that the electronic device extracts focuses in the order of a landmark, light source, person, and object; however, the present disclosure is not limited to this example. The order of operations S110 to S140 can be changed or some operation can be omitted.

Referring to FIG. 15, FIG. 15 illustrates a more detailed procedure of operation S200 in FIG. 13, which determines and displays an area including an extracted at least one object as a play viewpoint in a display unit.

First, the electronic device receives a request for playing a panorama image from a user at operation S210.

The electronic device plays a focus having the first priority according to a request for playing the focus at operation S220. If a predetermined time elapses or there is no change in movement of an area including a focus while playing the focus having the first priority at operation S230, the electronic device displays an area including a focus having a second priority by determining the area as a play viewpoint at operation S240.

Subsequently, if a user input for moving a focus is detected by a finger or stylus touching a specific area (for example, right or left side) of a touch panel or a displayed icon or touching a part of the touch panel and dragging for a predetermined distance in a specific direction (for example, right or left direction) at operation S250, the play viewpoint changes to an area including a focus according to the user input at operation S260.

Meanwhile, a method for controlling a display of a panorama image in an electronic device according to various embodiments of the present disclosure may include extracting at least one focus by analyzing at least one object included in the panorama image and displaying an area including the extracted at least one focus in a display unit by determining the area as a play viewpoint of the panorama image.

Here, the operation of playing an area in a display unit may include displaying an image of the determined play viewpoint if the panorama image is a still image.

The operation of playing in a display unit may include displaying a thumbnail in the display unit by extracting from an image determined as a play viewpoint if the panorama image is a moving image and the thumbnail of the panorama image is requested to be displayed.

The operation of playing in a display unit may include determining an area including a focus having the highest priority as an initial play viewpoint from the extracted at least one focus if the panorama image is a moving image and the panorama image is requested to be played.

The operation of playing in a display unit may be performed by changing a play viewpoint of the panorama image sequentially according to the priority of the extracted focus.

The operation of playing in a display unit may include changing the play viewpoint to an area including a focus having a lower priority if the focus stops for more than a predetermined time in a state that one of the areas including a focus is being played.

The method may further include identifying location information of the electronic device by receiving a GPS signal, and the operation of extracting a focus may include identifying landmark information corresponding to the identified location information of the electronic device and extracting at least one object matched with the landmark information as the focus from at least one object included in the panorama image.

The operation of identifying landmark information may include transmitting the identified location information of the electronic device to an external server and receiving the landmark information corresponding to the location information from the external server.

The method may further include generating and displaying a GUI for inputting a priority of the extracted at least one focus and determining the priority of the focus according to a user input through the GUI According to various embodiments of the present disclosure, a user can watch a panorama image without a loss of a highlighted part by extracting focuses corresponding to meaningful viewpoints from the panorama image and playing the corresponding focuses sequentially and automatically.

An electronic device and a method for controlling to display a panorama image according to various embodiments of the present disclosure can provide a meaningful play viewpoint from an image for a user when playing a 360° panorama image.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display configured to display a panorama image; and
a processor,
wherein the processor is configured to:
   extract at least two foci by analyzing at least one object included in the panorama image,
   determine an area including a focus having the highest priority from the extracted at least two foci,
   control to display the determined area including the focus having the highest priority as an initial play viewpoint, on the display,
   receive a user input for moving a focus by touching a specific area on the panorama image being displayed and dragging for a predetermined distance in a right or a left direction, and
   starting with the initial play viewpoint, change a play viewpoint of the panorama image to an area including a focus according to the user input.

2. The electronic device of claim 1, wherein the processor is further configured to control to display an image determined as a play viewpoint on the display if the panorama image is a still image.

3. The electronic device of claim 1, wherein the processor is further configured to control to display a thumbnail on the display by extracting from an image determined as a play viewpoint if the panorama image is a moving image and the thumbnail of the panorama image is requested to be displayed.

4. The electronic device of claim 1, wherein the panorama image is a moving image.

5. The electronic device of claim 1, wherein the processor is further configured to change the play viewpoint to an area including a focus having a lower priority than the focus currently being displayed if the focus currently being displayed stops for more than a predetermined time in a state that one of the areas including one of the extracted at least two foci is being played.

6. The electronic device of claim 3, further comprising:
a global positioning system (GPS) configured to identify a location of the electronic device by receiving a GPS signal,
wherein the processor is further configured to:
   identify landmark information corresponding to location information of the electronic device identified by the GPS, and
   extract at least one object matched with the landmark information as one of the at least two foci from the at least one object included in the panorama image.

7. The electronic device of claim 6,
wherein the landmark information comprises text information of a landmark corresponding to the location information of the electronic device, and
wherein the processor is further configured to extract at least one object matched with the text information of the landmark as one of the at least two foci from the at least one object included in the panorama image.

8. The electronic device of claim 5, further comprising:
a transceiver configured to:
   communicate with an external server,
   transmit location information of the electronic device identified by a global positioning system (GPS) to the external server, and
   receive landmark information corresponding to the location information from the external server.

9. The electronic device of claim 4, wherein the processor is further configured to extract an area having a brightness higher than a predetermined value as one of the at least two foci from the panorama image.

10. The electronic device of claim 4, wherein the processor is further configured to:
   extract at least one person object as one of the at least two foci from objects in the panorama image,
   extract a moving person object as one of the at least two foci from the at least one person object, or
   extract an object located at a location at which the at least one person object is/are looking as one of the at least two foci.

11. A method for controlling a display of a panorama image in an electronic device, the method comprising:
extracting at least two foci by analyzing at least one object included in the panorama image;
determining an area including a focus having the highest priority from the extracted at least two foci;
displaying the determined area including the focus having the highest priority as an initial play viewpoint;
receive a user input for moving a focus by touching a specific area on the panorama image being displayed and dragging for a predetermined distance in a right or a left direction; and
starting with the initial play viewpoint changing a play viewpoint of the panorama image to an area including a focus according to the user input.

12. The method of claim 11, wherein the displaying of the determined area comprises:
displaying an image determined as a play viewpoint if the panorama image is a still image.

13. The method of claim 11, wherein the displaying of the determined area comprises:
displaying a thumbnail on the display by extracting from an image determined as a play viewpoint if the panorama image is a moving image and the thumbnail of the panorama image is requested to be displayed.

14. The method of claim 11, wherein the panorama image is a moving image.

15. The method of claim 11, wherein the displaying of the determined area comprises:
changing the play viewpoint to an area including a focus having a lower priority than the focus currently being displayed if the focus currently being displayed stops for more than a predetermined time in a state that one of the areas including one of the at least two foci is being played.

16. The method of claim 14, further comprising:
identifying location information of the electronic device by receiving a global positioning system (GPS) signal,
wherein the extracting of the at least two foci comprises:
identifying landmark information corresponding to the identified location information of the electronic device, and
extracting at least one object matched with the landmark information as one of the at least two foci from the at least one object included in the panorama image.

17. The method of claim 16, wherein the identifying of the landmark information comprises:
transmitting the identified location information of the electronic device to an external server; and
receiving the landmark information corresponding to the location information from the external server.

18. The electronic device of claim 1, wherein the processor is further configured to:
determine a priority of each of the at least two foci, and
change the play viewpoint corresponding to a focus having the next lowest priority.

19. The method of claim 11, further comprising:
determining a priority of each of the at least two foci; and
changing the play viewpoint corresponding to a focus having the next lowest priority.

* * * * *